(12) United States Patent
Zhang

(10) Patent No.: US 10,895,773 B1
(45) Date of Patent: Jan. 19, 2021

(54) DISPLAY DEVICE

(71) Applicant: WUHAN CHINA STAR OPTOELECTRONICS TECHNOLOGY CO., LTD, Hubei (CN)

(72) Inventor: Peng Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/613,426

(22) PCT Filed: Aug. 7, 2019

(86) PCT No.: PCT/CN2019/099541
§ 371 (c)(1),
(2) Date: Nov. 14, 2019

(30) Foreign Application Priority Data

Jul. 16, 2019 (CN) .......................... 2019 1 0641484

(51) Int. Cl.
*G02F 1/1335* (2006.01)
*G02F 1/1368* (2006.01)

(52) U.S. Cl.
CPC ...... *G02F 1/133512* (2013.01); *G02F 1/1368* (2013.01); *G02F 1/133514* (2013.01); *G02F 1/133528* (2013.01); *G02F 2202/28* (2013.01)

(58) Field of Classification Search
CPC ......... G02F 1/133308; G02F 1/133528; G02F 1/13338; G02F 1/133512; G02F 1/133514; G02F 1/1368; G02F 2202/28

USPC ...................................................... 349/58–60
See application file for complete search history.

(56) References Cited

U.S. PATENT DOCUMENTS

| | | | | |
|---|---|---|---|---|
| 10,534,221 | B1* | 1/2020 | Zhu | G02F 1/133528 |
| 2019/0278132 | A1* | 9/2019 | Nakamura | G02F 1/133528 |
| 2019/0384121 | A1* | 12/2019 | Nishiwaki | G02F 1/133514 |
| 2020/0064681 | A1* | 2/2020 | Son | G06F 1/1637 |

FOREIGN PATENT DOCUMENTS

| | | |
|---|---|---|
| CN | 108681131 A | 10/2018 |
| CN | 109031756 A | 12/2018 |
| CN | 109272868 A | 1/2019 |
| CN | 109445171 A | 3/2019 |
| CN | 109597236 A | 4/2019 |
| CN | 109637373 A | 4/2019 |
| CN | 208922027 U | 5/2019 |

* cited by examiner

*Primary Examiner* — Charles S Chang
(74) *Attorney, Agent, or Firm* — Mark M. Friedman

(57) ABSTRACT

A display device is provided, including a backlight module and a liquid crystal display module. The backlight module is provided with a through hole. The liquid crystal display module includes a display panel and a lower polarizing film and an upper polarizing film arranged on two opposite sides of the display panel. A first via hole is in the lower polarizing film. A second via hole is in the upper polarizing film and arranged corresponding to the first via hole. A light shielding portion is arranged at two side edges of the second via hole. Such configuration avoids light leakage from the first via hole and the second via hole of the liquid crystal display module, and improves shooting performance of the camera module and also enhances market competitiveness.

7 Claims, 1 Drawing Sheet

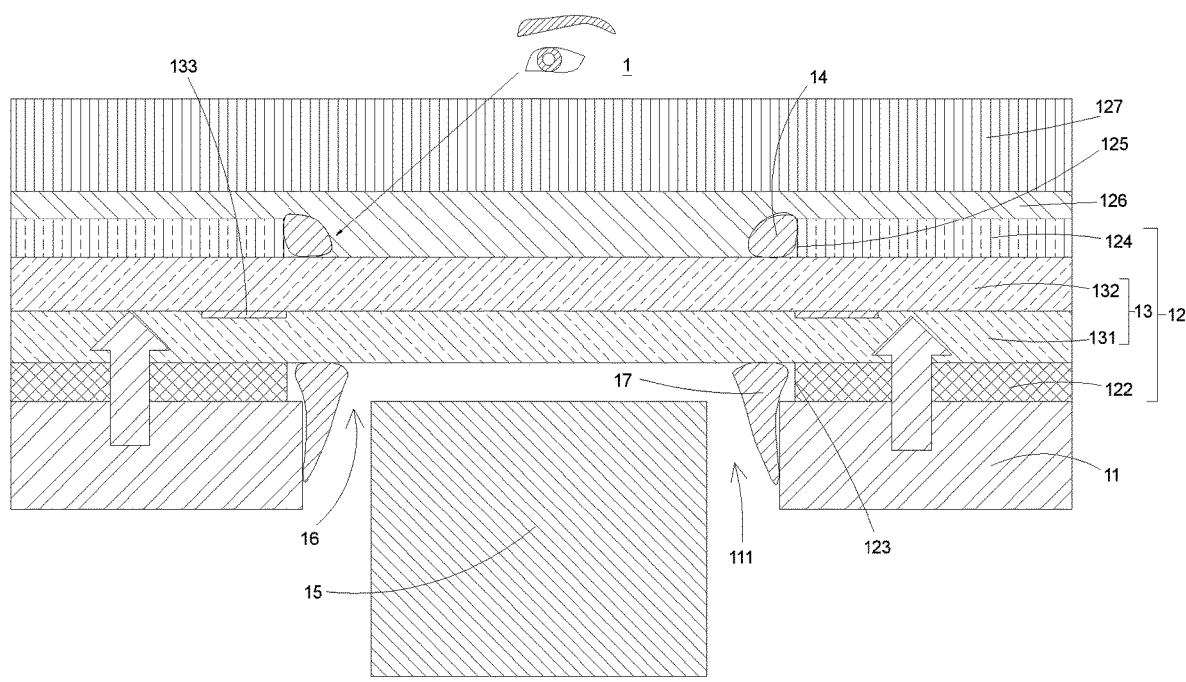

DISPLAY DEVICE

FIELD OF DISCLOSURE

The present invention relates to a field of display devices and in particular, to a display device with an under-screen camera.

DESCRIPTION OF RELATED ART

With development of liquid crystal display technology—especially the development of full-screen technology, there has been an increasing demand for a display device (such as a tablet computer and a smart phone) which has an opening in the display region and has an in-plane camera (i.e., an under-screen camera) set therein to increase a screen ratio of the display region. A conventional display device comprises a display panel, a backlight module disposed under the display panel, a glass cover disposed above the display panel, and a camera module disposed under the glass cover. The backlight module is further provided with a camera hole for accommodating the camera module. In addition, upper and lower polarizing films attached to upper and lower surfaces of the display panel are also provided with via holes corresponding to the camera hole, so that the camera module can shoot images through the display panel.

Problem to be Solved

Since light of the backlight module easily leaks through edges of the via holes of the upper polarizing film and the lower polarizing film, shooting performance and image quality of the camera are affected.

SUMMARY

It is an objective of the present invention to provide a display device with an under-screen camera to avoid leaking light from edges of a first via hole and a second via hole of a liquid crystal display module, thus improving shooting performance and image quality of the camera module, and enhancing market competitiveness.

Accordingly, the present invention provides a display device. The display device comprises a backlight module, a liquid crystal display module, and a camera module. A through hole is defined in the backlight module. The liquid crystal display module comprises a display panel and a lower polarizing film and an upper polarizing film disposed on two opposite sides of the display panel. A first via hole is defined in the lower polarizing film. A second via hole is defined in the upper polarizing film and arranged corresponding to the first via hole. A light shielding portion is disposed at two side edges of the second via hole. The camera module is disposed in the through hole.

Preferably, the display device further comprises a light-shielding adhesive material disposed at two side edges of the first via hole, wherein the through hole is defined corresponding to the first via hole, the light-shielding adhesive material is extended from the first via hole to an inner surface of a peripheral wall of the through hole.

Preferably, the light shielding portion is made of one of a black ultraviolet adhesive, a black hot-melt adhesive, and black epoxy resin.

Preferably, the light-shielding adhesive material is made of one of a black ultraviolet adhesive, a black hot-melt adhesive, and black epoxy resin.

Preferably, the light shielding portion is disposed in contact with a top surface of the display panel, and the light shielding portion is disposed in contact with an edge portion of a peripheral wall of the second via hole and connected to the upper polarizing film.

Preferably, the liquid crystal display module further comprises an optical layer disposed on the upper polarizing film, and the optical layer is filled in the first via hole and covers the light shielding portion.

Preferably, a size of each of the through hole, the via hole, and the second via hole is greater than or equal to a size of the camera module.

Preferably, the through hole and the first via hole together constitute an under-screen blind hole of the display device, the camera module is a camera, and the backlight module provides a side light source or a direct light source.

Preferably, the display panel further comprises a thin film transistor (TFT) substrate, a color filter substrate, and two light-shielding adhesive layers, the TFT substrate is disposed on the lower polarizing film, the color filter substrate is disposed on the TFT substrate, and the light shielding adhesive layers are sandwiched between the TFT substrate and the color filter substrate.

Preferably, a first end of each of the light-shielding adhesive layers is disposed near the first via hole and the second via hole, and the first end does not extend beyond the light shielding portion.

Preferably, the present invention provides a display device, comprising a backlight module and a liquid crystal display module. A through hole is defined in the backlight module. The liquid crystal display comprises a display panel and a lower polarizing film and an upper polarizing film disposed on two opposite sides of the display panel. A first via hole is defined in the lower polarizing film, a second via hole is defined in the upper polarizing film and arranged corresponding to the first via hole, and a light shielding portion is disposed at two side edges of the second via hole.

The display device further comprises a camera module and a light-shielding adhesive material, wherein the camera module is disposed in the through hole, the light-shielding adhesive material is disposed at two side edges of the first via hole, the through hole is arranged corresponding to the first via hole, and the light-shielding adhesive material is extended from the first via hole to an inner surface of a peripheral wall of the through hole.

Preferably, the light shielding portion is made of one of a black ultraviolet adhesive, a black hot-melt adhesive, and black epoxy resin.

Preferably, the light-shielding adhesive material is made of one of a black ultraviolet adhesive, a black hot-melt adhesive, and black epoxy resin.

Preferably, the light shielding portion is disposed in contact with a top surface of the display panel, and the light shielding portion is disposed in contact with an edge portion of a peripheral wall of the second via hole and connected to the upper polarizing film.

Preferably, the liquid crystal display module further comprises an optical layer disposed on the upper polarizing film, and the optical layer is filled in the second via hole and covers the light shielding portion.

Preferably, a size of each of the through hole, the first via hole, and the second via hole is greater than or equal to a size of the camera module.

Preferably, the through hole and the first via hole together constitute an under-screen blind hole of the display device, the camera module is a camera, and the backlight module provides a side light source or a direct light source.

Preferably, the display panel further comprises a thin film transistor (TFT) substrate, a color filter substrate, and two light-shielding adhesive layers, the TFT substrate is disposed on the lower polarizing film, the color filter substrate is disposed on the TFT substrate, and the light-shielding adhesive layers are sandwiched between the TFT substrate and the color filter substrate.

Advantages of the Present Invention

By placing the camera module under the display panel, a screen ratio of the display region of the display device is effectively increased. Accordingly, a narrow bezel design or even a bezel-less design of the display device can be realized, and a visual experience and visual appeal of the display device are also improved.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work.

FIG. 1 is a cross-sectional view illustrating a display device with an under-screen camera according to the present invention.

DETAILED DESCRIPTION OF EMBODIMENTS

Any embodiment in the following description mean that specific features, structures, or characteristics described in connection with the embodiment may be included in at least one embodiment of the invention. The same terms appearing in different places in the specification are not necessarily limited to the same embodiment, but should be understood as independent or alternative embodiments to other embodiments. In view of the technical solutions disclosed in the embodiments of the present invention, those skilled in the art should understand that the embodiments described herein may have other combinations or modifications in accordance with the embodiments of the present invention.

Please refer to FIG. 1. FIG. 1 is a cross-sectional view illustrating a display device with an under-screen camera according to the present invention. As shown in the drawing, the present invention provides a display device 1 with an under-screen camera. The display device 1 comprises a backlight module 11, a liquid crystal display module 12, and a camera module 15. The display device 1 is, but not limited to, a smart phone, an in-vehicle touch display, an industrial control display, or other consumer display device. The backlight module 11 can optionally provides a side light source or a direct light source; configuration may vary as needed. The camera module 15 is a common camera, which is a prior art, so a detailed description thereof is not described herein.

The backlight module 11 comprises a through hole 111 defined therein. The through hole 111 is a camera hole. The liquid crystal display module 12 comprises a display panel 13 and a lower polarizing film 122 and an upper polarizing film 124 disposed on two opposite sides of the display panel 13. A first via hole 123 is defined in the lower polarizing film 122. A second via hole 125 is defined in the upper polarizing film 124 and arranged corresponding to the first via hole 123. A light shielding portion 14 is disposed (preferably, by coating) at two side edges (i.e., a periphery) of the second via hole 125. A light-shielding adhesive material 17 is disposed (preferably, by coating) at two side edges (i.e., a periphery) of the first via hole 123. The camera module 15 is disposed in the through hole 111.

The through hole 111 communicates with the first via hole 123, and the through hole 111 is arranged corresponding to the first via hole 123. The light-shielding adhesive material 17 is extended from the first via hole 123 to an inner surface of a peripheral wall of the through hole 111, thus increasing a light shielding effect. The light shielding portion 14 or the light-shielding adhesive material 17 is made of one of a black ultraviolet (UV) adhesive, a black hot-melt adhesive, black epoxy resin, or other suitable material. Therefore, by using the light-shielding adhesive material 17 disposed (preferably, by coating) in the first via hole 123 and on the peripheral wall of the through hole 111, and by utilizing the light shielding portion 14 disposed (preferably, by coating) on the two side edges of the second via hole 125, light is prevented from leaking from the first via hole 123 and the second via hole 125 of the liquid crystal display module 12 and the through hole 111, and as a result, shooting performance, image quality, and market competitiveness of the camera module 15 are improved.

According to the embodiment shown in FIG. 1, the light shielding portion 14 is disposed on a top surface of the display panel 12, and is disposed in contact with an edge portion of a peripheral wall of the second via hole 125 and connected to the upper polarizing film 124. Thereby, adhesion and light shielding ability of the light shielding portion 14 are increased.

A size of each of the through hole 111, the via hole 123, and the second via hole 125 is greater than or equal to a size of the camera module 15, so that the camera module 15 can be accommodated therein. The through hole 111 and the first via hole 123 together constitute an under-screen blind hole 16 of the display device 1, so that the camera module 15 can be disposed below the display panel 13, and thereby, a screen ratio of the display region of the display device 1 is effectively increased. Accordingly, a narrow bezel design or even a bezel-less design of the display device 1 can be realized, and a visual experience and visual appeal of the display device 1 are improved.

The display panel 13 further comprises a thin film transistor (TFT) substrate 131, a color filter substrate 132, and two light-shielding adhesive layers 133. The TFT substrate 131 is disposed on the lower polarizing film 122, the color filter substrate 132 is disposed on the TFT substrate 131, and the two light-shielding adhesive layers 133 are sandwiched between the TFT substrate 131 and the color filter substrate 132. In the embodiment shown in FIG. 1, a first end of each of the light-shielding adhesive layers 133 is disposed near the first via hole 123 and the second via hole 125, and the first end does not extend beyond the light shielding portion 14.

The liquid crystal display module 12 further comprises an optical layer 126 disposed on the upper polarizing film 124 and a glass cover 127 disposed on the optical layer 126. In a manufacturing process, at last, the optical layer 126 is filled in the second via hole 125 and wraps the light shielding portion 14. The optical layer 126 is made of an optical clear adhesive (OCA), an optical clear resin (OCA), or other suitable material; and the present invention is not limited in this regard. Specifically, the optical layer 126 as shown in FIG. 1 fills the second via 125 to bond the glass cover 127 and the color filter substrate 132 and achieve other effects.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. A display device, comprising:
   a backlight module, wherein a through hole is defined in the backlight module;
   a liquid crystal display module, the liquid crystal display module comprising a display panel and a lower polarizing film and an upper polarizing film disposed on two opposite sides of the display panel, wherein a first via hole is defined in the lower polarizing film; a second via hole is defined in the upper polarizing film and arranged corresponding to the first via hole; and a light shielding portion is disposed at two side edges of the second via hole;
   a camera module disposed in the through hole; and
   a light-shielding adhesive material disposed at two side edges of the first via hole, wherein the through hole is defined corresponding to the first via hole, the light-shielding adhesive material extends from the first via hole to an inner surface of a peripheral wall of the through hole;
   wherein the display panel comprises a thin film transistor (TFT) substrate, a color filter substrate, and two light-shielding adhesive layers; the TFT substrate is disposed on the lower polarizing film, the color filter substrate is disposed on the TFT substrate, and the light-shielding adhesive layers are sandwiched between the TFT substrate and the color filter substrate;
   wherein a first end of each of the light-shielding adhesive layers is disposed near the first via hole and the second via hole, and the first end does not extend beyond the light shielding portion.

2. The display device according to claim 1, wherein the light shielding portion is made of one of a black ultraviolet adhesive, a black hot-melt adhesive, and black epoxy resin.

3. The display device according to claim 1, wherein the light-shielding adhesive material is made of one of a black ultraviolet adhesive, a black hot-melt adhesive, and black epoxy resin.

4. The display device according to claim 3, wherein the liquid crystal display module further comprises an optical layer disposed on the upper polarizing film, and the optical layer is filled in the first via hole and covers the light shielding portion.

5. The display device according to claim 1, wherein the light shielding portion is disposed in contact with a top surface of the display panel, and the light shielding portion is disposed in contact with an edge portion of a peripheral wall of the second via hole and connected to the upper polarizing film.

6. The display device according to claim 1, wherein a size of each of the through hole, the via hole, and the second via hole is greater than or equal to a size of the camera module.

7. The display device according to claim 1, wherein the through hole and the first via hole together constitute an under-screen blind hole of the display device, the camera module is a camera, and the backlight module provides a side light source or a direct light source.

* * * * *